United States Patent
Hewkin

(10) Patent No.: US 6,810,865 B2
(45) Date of Patent: Nov. 2, 2004

(54) EXHAUST GAS RECYCLE (EGR) ASSEMBLY

(75) Inventor: David Hewkin, Kalamazoo, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 14 days.

(21) Appl. No.: 10/388,164

(22) Filed: Mar. 14, 2003

(65) Prior Publication Data
US 2003/0226552 A1 Dec. 11, 2003

Related U.S. Application Data
(60) Provisional application No. 60/364,143, filed on Mar. 15, 2002.

(51) Int. Cl.[7] .......................... F02M 25/07; F16L 59/16
(52) U.S. Cl. ..................... 123/568.11; 285/47; 285/918
(58) Field of Search ................. 123/568.11; 251/129.11, 251/214; 285/47, 48, 50, 211, 330, 363, 364, 382, 382.2, 414, 906, 918

(56) References Cited

U.S. PATENT DOCUMENTS

| | | | | |
|---|---|---|---|---|
| 4,960,296 A | * | 10/1990 | Thelen et al. ................. 285/50 |
| 5,007,667 A | * | 4/1991 | Unewisse et al. ......... 285/382.2 |
| 5,425,347 A | * | 6/1995 | Zinke, II ............... 123/568.11 |
| 5,433,183 A | * | 7/1995 | Vansnick ............... 123/568.11 |
| 6,039,120 A | * | 3/2000 | Wilkins et al. ................ 285/32 |
| 6,530,366 B2 | * | 3/2003 | Geiger et al. .......... 123/568.11 |
| 6,532,931 B1 | * | 3/2003 | Saba et al. ............. 123/568.11 |
| 2004/0065861 A1 | * | 4/2004 | Bircann ................. 123/568.11 |

* cited by examiner

Primary Examiner—Willis R. Wolfe, Jr.
(74) Attorney, Agent, or Firm—Crowell & Moring LLP

(57) ABSTRACT

An exhaust gas recycle (EGR) isolation flange that includes an annular body that defines a central aperture therethrough and a plurality of axially extending bosses that extend from the body is disclosed. Additionally, a method for coupling an exhaust gas recycle flange to an isolation flange is disclosed where the EGR flange is mated to the isolation flange by receiving an isolation flange boss within a boss receiving aperture of the EGR flange and by disposing a seal ring between the EGR flange body and the isolation flange body.

19 Claims, 3 Drawing Sheets

US 6,810,865 B2

EXHAUST GAS RECYCLE (EGR) ASSEMBLY

This application claims the benefit of Provisional application No. 60/364,143 filed Mar. 15, 2002.

BACKGROUND OF THE INVENTION

Exhaust gas recycle (EGR) is the principal technique used for control of spark ignition (SI) NOx emissions. The EGR gases are used to help reduce the combustion chamber temperatures, thus lowering the NOx that is produced during the combustion process. An EGR flange is used to introduce the EGR gases into the airflow stream of the engine intake system through an intake manifold to distribute the EGR gases equally. The EGR gases can have temperatures of up to 275° C. and higher, depending on the percentage of EGR gas that is being introduced into the airflow stream. For an aluminum manifold, this high temperature for the EGR gases is not a problem. The EGR flange can be manufactured in one piece because the flange area that mates with the aluminum manifold does not need to be isolated from the manifold. The aluminum manifold is able to withstand the high temperature of the EGR gases, and consequently, the high temperature of the EGR flange.

However, there are problems associated with these high temperatures if the manifold is comprised of a non-metallic material, such as plastic. These hot gases can damage or destroy a plastic manifold. Therefore, plastic manifolds must be isolated from these hot gases.

Currently, cold tubes are used to introduce the EGR gases into the airflow stream where a plastic manifold is used. The cold tube allows the EGR gases to travel a distance before entering the plastic manifold. However, with use of the cold tube, the gases are not directly introduced into the plastic manifold.

Therefore, it would be desirable to provide an alternative apparatus and method for introducing EGR gases into a manifold that is comprised of a non-metallic material.

SUMMARY OF THE INVENTION

In an embodiment of the apparatus of the present invention, an exhaust gas recycle (EGR) isolation flange is provided. The EGR isolation flange includes an annular body that defines a central aperture therethrough and a plurality of bosses. The plurality of bosses extend axially from the body in a direction substantially perpendicular to a plane of the body.

In an embodiment of a method in accordance with the present invention, a method for coupling an exhaust gas recycle (EGR) flange to an isolation flange is provided. The method includes the acts of mating the EGR flange to the isolation flange by receiving an isolation flange boss within a boss receiving aperture of the EGR flange and disposing a seal ring between the EGR flange body and the isolation flange body such that the EGR flange body is physically isolated from the isolation flange body.

BRIEF DESCRIPTION OF THE DRAWINGS

The various features of the invention will best be appreciated by simultaneous reference to the description which follows and the accompanying drawings.

DETAILED DESCRIPTION OF THE DRAWINGS

Figure 1:
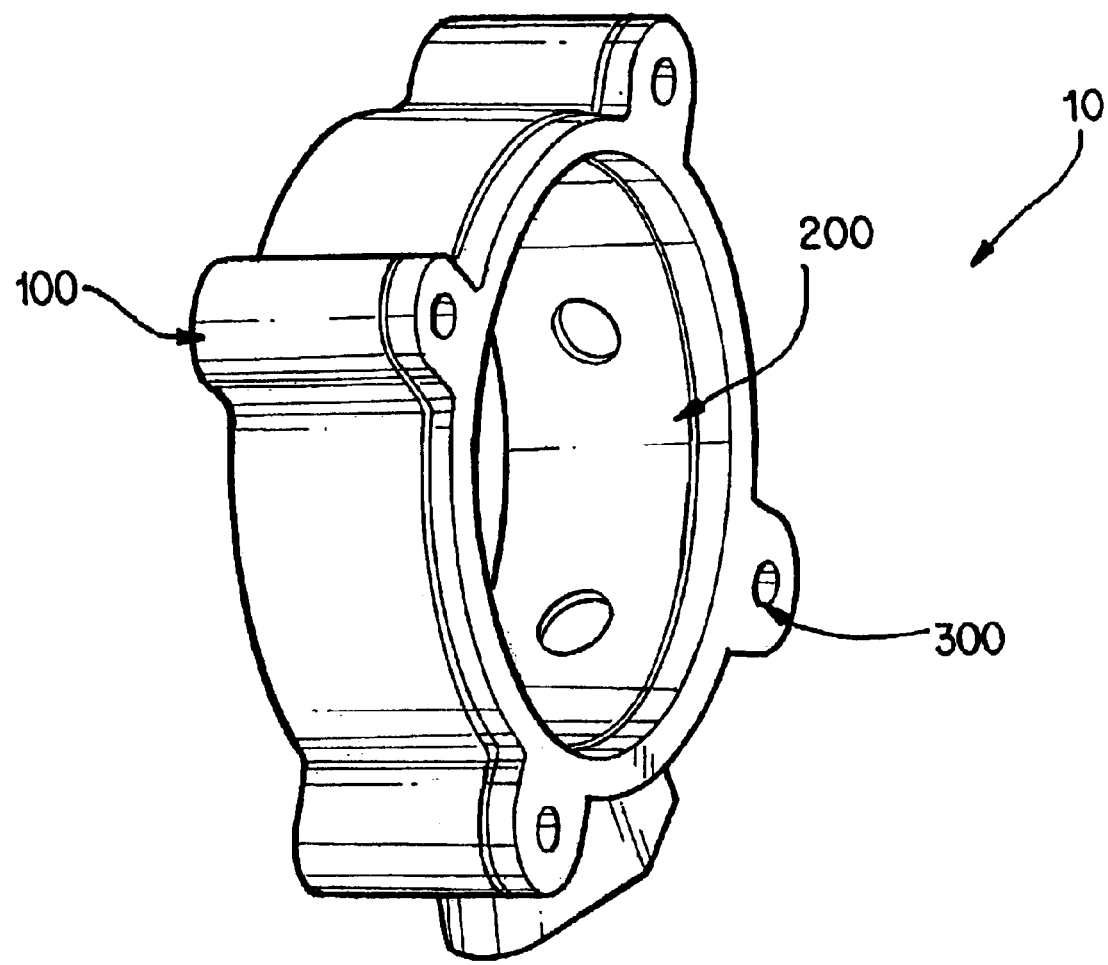
FIG. 1 is a perspective view of an exhaust gas recycle (EGR) assembly in accordance with the principles of the present invention.

FIG. 1 illustrates an embodiment of an exhaust gas recycle (EGR) assembly 10 in accordance with the principles of the present invention. As can be seen, EGR assembly 10 includes an EGR flange 100, a distribution flange 200, and an isolation flange 300. As will be further explained later in this specification, distribution flange 200 is disposed within EGR flange 100 and isolation flange 300 is secured to EGR flange 100. As will also be further described later in this specification, isolation flange 300 is disposed between EGR flange 100 and a manifold (not shown) of an engine intake system, where the manifold is comprised of a non-metallic material, e.g., a synthetic resin or plastic. Thus, isolation flange 300 physically isolates EGR flange 100 from the plastic manifold. As such, isolation flange 300 serves to isolate the EGR flange, which has a high temperature due to the passage of hot exhaust recycle gases through it, from the plastic manifold. The hot EGR flange, if it was mated directly to the plastic manifold, would most likely damage the plastic manifold. Therefore, the isolation flange provides for direct input of the exhaust gases into the plastic intake manifold while protecting the manifold from the high temperature EGR flange.

Figure 2:
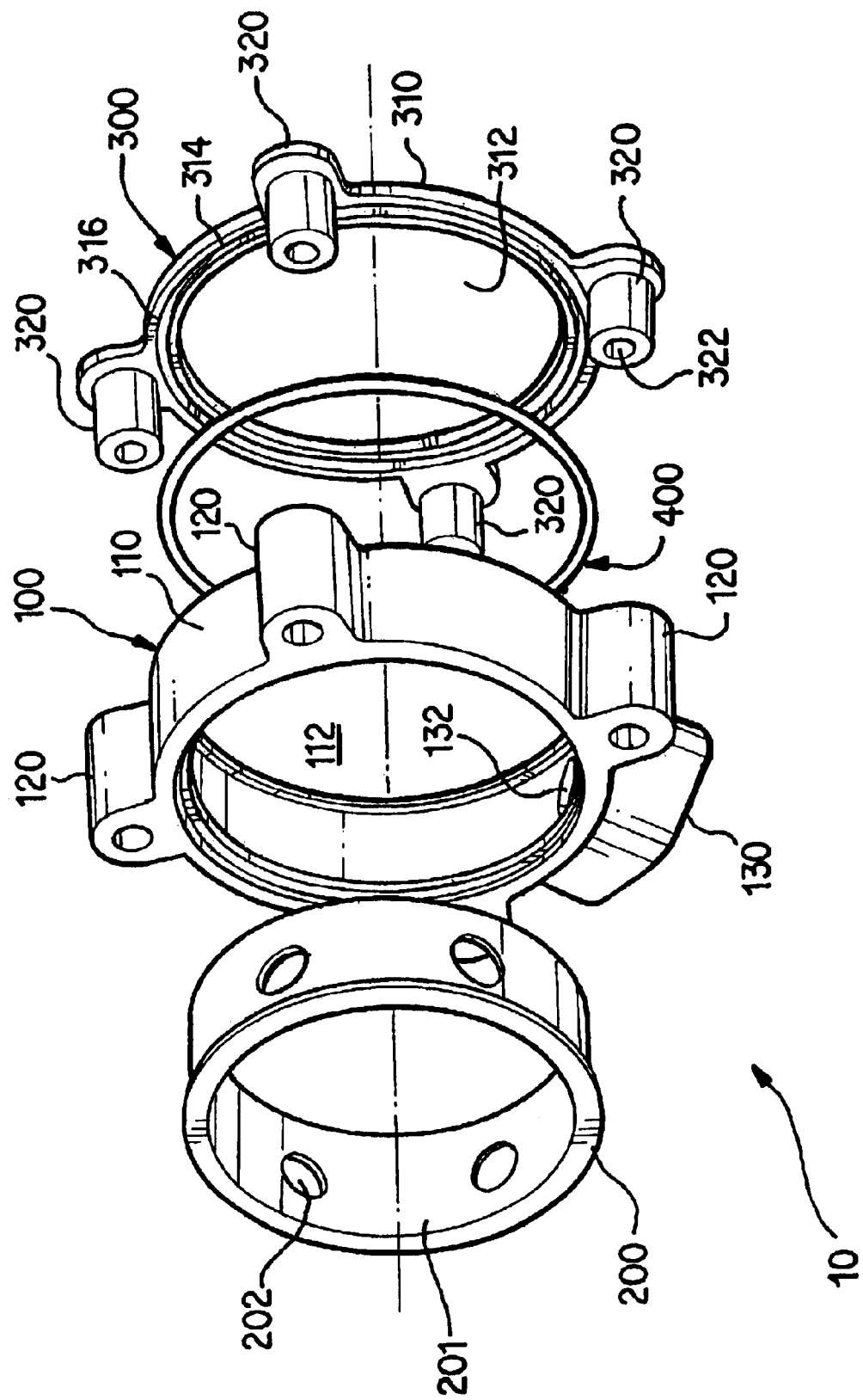
FIG. 2 is an exploded perspective view of the EGR assembly of FIG. 1.

FIG. 2 is an exploded perspective view of EGR assembly 10. As discussed previously, EGR assembly 10 includes EGR flange 100, distribution flange 200, and isolation flange 300. Additionally, EGR assembly 10 includes O-ring 400. Each of these components will now be described in further detail.

EGR flange 100 is comprised of an annular body 110 that defines a central aperture 112 therethrough. The exhaust gases pass through aperture 112. A plurality of boss receiving hubs 120 extend from body 110 on an outer periphery of the body. Each boss receiving hub 120 defines a boss receiving aperture 122. As can be seen, the boss receiving hubs 120 are spaced equally around body 110. Thus, opposing receiving hubs on body 110 are positioned approximately 180° with respect to each other and adjacent boss receiving hubs are positioned approximately 90° from each other around body 110. As will be further explained later in this specification, boss receiving hubs 120 receive bosses 320 of isolation flange 300 within them. Whereas four boss receiving hubs 120 and four bosses 320 are illustrated, any number of boss receiving hubs and associated bosses can be utilized. Thus, the present invention is not limited to any particular number of boss receiving hubs and associated bosses.

EGR flange 100 also includes EGR valve mating assembly 130 at a lower end of body 110. EGR valve mating assembly 130 defines an aperture 132 therethrough. Aperture 132 extends completely through EGR valve mating assembly 130 such that it opens into central aperture 112. An EGR valve (not shown) attaches to EGR flange 100 at valve mating assembly 130. Gases provided by the EGR valve flow through aperture 132 and into EGR flange 100. When the exhaust gases enter EGR flange 100 through aperture 132, they contact distribution flange 200 which is disposed within body 110 of the EGR flange.

As described above, distribution flange 200 is disposed within body 110 of EGR flange 100. Distribution flange 200 is disposed within body 110 such that a space 203 exists between the body 201 of distribution flange 200 and body 110 of EGR flange 100. This space 203 between distribution flange 200 and EGR flange 100 can be seen in FIG. 3. Thus, as exhaust gases are provided from the EGR valve through aperture 132 of EGR valve mating assembly 130, the gases contact body 201 of distribution flange 200 and are directed around the annular body 110 of EGR flange 100 through the space 203 defined by distribution flange 200 and body 110. As the exhaust gases circulate around the space between distribution flange 200 and EGR flange body 110, the gases further flow through the apertures 202 of distribution flange 200 and into central aperture 112 of EGR flange 100. The gases then flow through central aperture 112 of EGR flange 100 and aperture 312 of isolation flange 300 and into the plastic intake manifold. Thus, distribution flange 200 serves to distribute exhaust gases provided by the EGR valve into the central aperture 112 of EGR flange 100 such that they mix evenly with the air flow stream traveling through EGR assembly 10 and into the plastic intake manifold.

In continuing further with the description of the components of EGR assembly 10, isolation flange 300 includes an annular body 310. Body 310 defines a plane on which body 310 lies and also defines a central aperture 312, as discussed above. Central aperture 312 aligns with central aperture 112 of EGR flange 100. Body 310 also defines a groove 314 in an axial end face of a first side 316 of body 310. Groove 314 extends around the entire circumference of body 310 and receives O-ring 400 within it.

As mentioned above, isolation flange 300 also includes a plurality of bosses 320 that extend from an outer edge of body 310 and extend axially in a direction that is substantially perpendicular to the plane defined by body 310. Each of the plurality of bosses 320 define a bore 322 that extends along the length of the boss and completely through the boss. In an assembled configuration for EGR assembly 10, the bosses 320 extend toward EGR flange 100 and, as discussed above, are received within the boss receiving hubs 120 of the EGR flange.

As mentioned previously, EGR assembly 10 also includes O-ring 400. O-ring 400 is positioned within groove 314 of isolation flange 300. In the assembled configuration between isolation flange 300 and EGR flange 100, O-ring ring 400 is disposed between body 310 of isolation flange 300 and body 110 of EGR flange 100. Thus, there is no direct physical contact between body 310 of isolation flange 300 and body 110 of EGR flange 100. Therefore, O-ring 400 physically, and thermally, isolates body 310 of isolation flange 300 from body 110 of EGR flange 100. The physical isolation of body 110 of EGR flange 100 from body 310 of isolation flange 300 by O-ring 400 serves to minimize heat transfer between EGR flange 100 and isolation flange 300 in order to protect the plastic intake manifold from the high temperature of the EGR flange.

As described above, when isolation flange 300 is joined to EGR flange 100, O-ring 400 physically and thermally isolates body 310 of isolation flange 300 from body 110 of EGR flange 100. In order to mate isolation flange 300 with EGR flange 100, as was also described above, bosses 320 of isolation flange 300 are received within boss receiving hubs 120 of EGR flange 100. The assembled EGR assembly 10 is disposed between the throttle body and a plastic intake manifold of an internal combustion engine. Appropriate securing hardware can be utilized to secure the EGR assembly to the throttle body and plastic intake manifold. The securing hardware extends through apertures defined by bosses 320 and boss receiving hubs 120. The throttle body retains the distribution flange 200 in-place within EGR flange 100.

Figure 3:
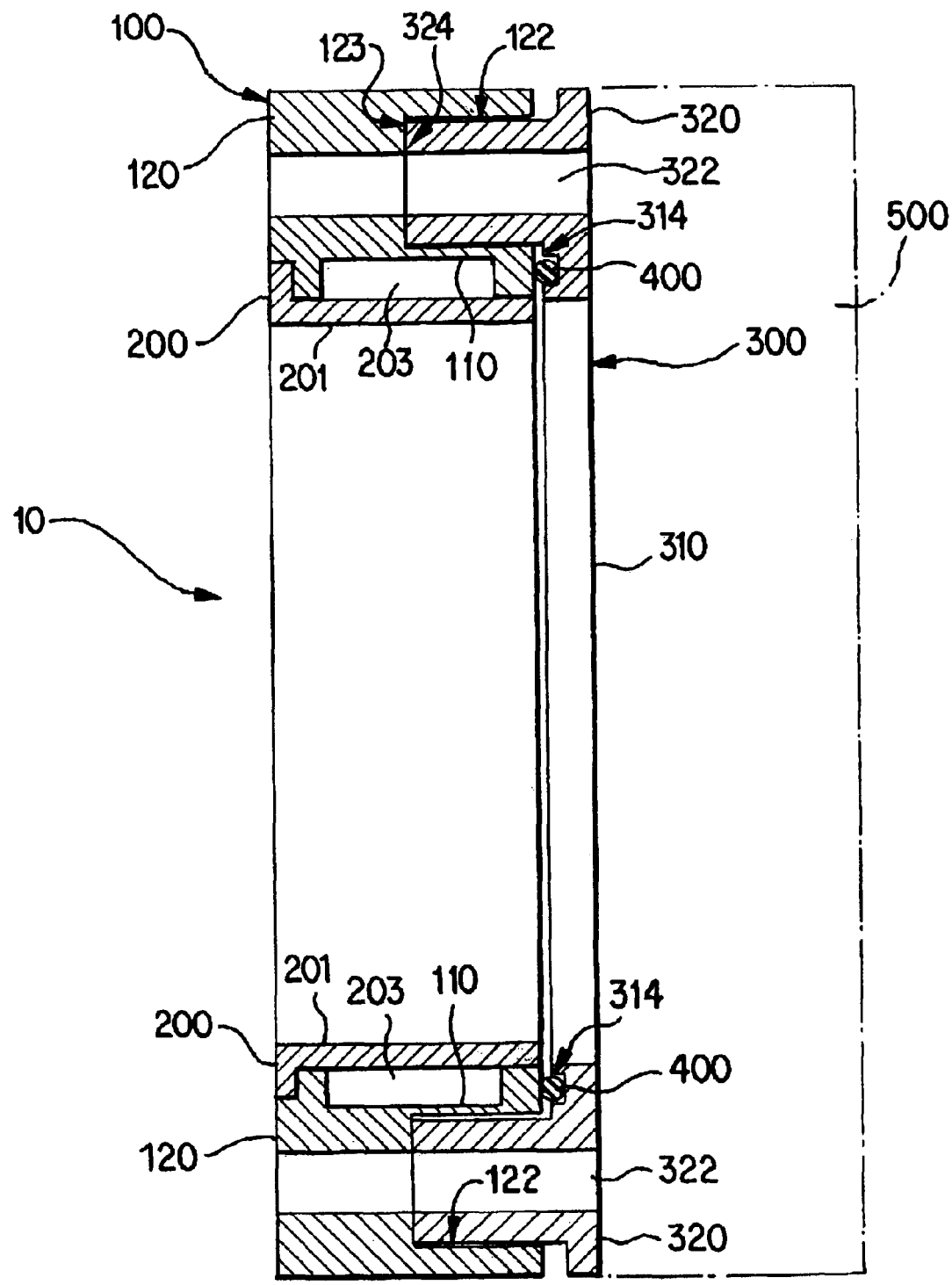
FIG. 3 is a cross-sectional view of the EGR assembly of FIG. 1.

Thus, as can be seen in FIG. 3, in an assembled configuration for EGR assembly 10, the only physical contact between the isolation flange 300 and the EGR flange 100 is at an axial end face 324 of isolation flange boss 320 and a base surface 123 of the receiving aperture in the boss receiving hub 120 for the respective bosses and boss receiving apertures. As can be seen, the side faces of the respective bosses and boss receiving hubs do not contact each other, further enhancing the thermal isolation characteristics of the isolation flange. As discussed previously, the body 310 of isolation flange 300 is physically separated from body 110 of EGR flange 100 by O-ring 400. Therefore, in the assembled configuration between isolation flange 300 and EGR flange 100, the only physical contact between isolation flange 300 and EGR flange 100 is through the front-face interface of the respective boss structures. This configuration minimizes heat transfer from EGR flange 100 to isolation flange 300. Minimal heat transfer between EGR flange 100 and isolation flange 300 is desirable in order to protect the plastic intake manifold from the high temperature of the EGR flange. As discussed above, and as can be seen in FIG. 3, a plastic intake manifold flange 500 (shown schematically in phantom) of the intake system of the internal combustion engine is mated on a side of isolation flange 300 that opposes EGR flange 100.

In order to serve as a suitable thermal isolation member between isolation flange 300 and EGR flange 100, O-ring 400 should be comprised of a material that is a poor conductor of heat. An exemplary suitable material for O-ring 400 is rubber.

Isolation flange 300 can be comprised from a variety of materials. Since the bosses 320 of isolation flange 300 mate with the boss receiving hubs 120 of EGR flange 100, the material of the isolation flange 300 that comprises bosses 320 must be able to withstand the heat transferred by the EGR flange 100 without failing. Thus, a suitable material is aluminum. As such, the entire isolation flange may be comprised of aluminum. However, since it is desired to minimize heat transfer between the body 310 of isolation flange 300 and body 110 of EGR flange 100, which is at least partially, if not totally, achieved by O-ring 400, it is contemplated that a material that is a poor conductor of heat could be utilized for comprising body 310 of isolation flange 300, such as a rubber. Thus, it is contemplated that the isolation flange could be comprised of two materials, one to comprise the bosses and one to comprise the body. The material that comprises the body would be a poor conductor of heat and the material that comprises the bosses would be able to withstand the temperatures of the EGR flange.

In accordance with a further feature of the present invention, a method for coupling the exhaust gas recycle (EGR) flange to the non-metallic manifold is provided. As was also previously described in discussing the apparatus of the present invention, the method includes the acts of mating the EGR flange to the first side of the isolation flange by receiving the isolation flange boss within the boss receiving aperture of the EGR flange and disposing the seal ring between the EGR flange body and the isolation flange body such that the EGR flange body is physically and thermally isolated from the isolation flange body. A manifold flange comprised of the non-metallic material and associated with a manifold is mated to a second side of the isolation flange.

Further in accordance with the principles of the present invention, a method for coupling the exhaust gas recycle (EGR) flange to the isolation flange is provided. In the method, the EGR flange is mated to a first side of the isolation flange by receiving the isolation flange boss within the boss receiving aperture of the EGR flange and disposing the seal ring between the EGR flange body and the isolation flange body.

As described above, the present invention provides the capability to connect an EGR flange to a non-metallic manifold of an engine intake system. The EGR flange is thermally isolated from the manifold through use of the isolation flange. The thermal isolation provided by the isolation flange protects the manifold from the high temperature of the EGR flange, which could damage the manifold.

Although the present invention has been described primarily in connection with use for a plastic manifold, the present invention has utility for use with a manifold that is comprised of any type of non-metallic or metallic material that is susceptible to damage from the high temperature of the EGR flange. Thus, the present invention has utility for use with any manifold that is comprised of a material that is susceptible to damage from the high temperature of the EGR flange.

The foregoing disclosure has been set forth merely to illustrate the invention and is not intended to be limiting. Since modifications of the disclosed embodiments incorporating the spirit and substance of the invention may occur to persons skilled in the art, the invention should be construed broadly to include everything within the scope of the appended claims and equivalents thereof.

What is claimed is:

1. An exhaust gas recycle (EGR) assembly, comprising:
    an EGR flange having an annular body and at least one boss receiving hub extending from said body on an outer periphery of said body, said boss receiving hub defining a boss receiving aperture;
    an EGR distribution ring disposed within said EGR flange;
    an isolation flange having an annular body and at least one boss for each boss receiving hub, each boss extending axially from said body in a direction substantially perpendicular to a plane of said body;
    wherein each isolation flange boss is received within a respective boss receiving aperture of said EGR flange; and
    a seal ring disposed between said EGR flange body and said isolation flange body such that said EGR flange body is physically isolated from said isolation flange body.

2. The exhaust gas recycle (EGR) assembly of claim 1 wherein each isolation flange boss defines a bore extending through said boss.

3. The exhaust gas recycle (EGR) assembly of claim 1 wherein said isolation flange body defines a groove, said groove extending circumferentially around said body and being disposed on a side of said body from which said at least one boss extends.

4. The exhaust gas recycle (EGR) assembly of claim 1 wherein said EGR flange includes a second boss receiving hub extending from said body on said outer periphery of said body and defining a boss receiving aperture and wherein said isolation flange includes a second boss, said second boss extending axially from said body in said direction substantially perpendicular to said plane of said body.

5. The exhaust gas recycle (EGR) assembly of claim 4
    wherein said isolation flange body is circular in shape and wherein said first boss and said second boss are positioned approximately 180° apart around a circumference of said isolation flange body;
    and wherein said EGR flange body is circular in shape and wherein said first boss receiving hub and said second boss receiving hub are positioned approximately 180° apart around a circumference of said EGR flange body.

6. The exhaust gas recycle (EGR) assembly of claim 1 wherein when said isolation flange boss is received within said boss receiving aperture of said EGR flange, a sole point of physical contact exists between an axial end face of said isolation flange boss and a base surface of the receiving aperture in said boss receiving hub.

7. An exhaust gas recycle (EGR) isolation flange assembly for coupling to an EGR flange having an annular body and a boss receiving hub extending from the body on an outer periphery of the body where the boss receiving hub defines a boss receiving aperture, comprising:
    an isolation flange having an annular body and a boss, said boss extending axially from said body in a direction substantially perpendicular to a plane of said body; and
    a seal ring;
    wherein in an operative configuration with the EGR flange, said isolation flange boss is received within the EGR flange boss receiving aperture and said seal ring is disposed between the EGR flange body and said isolation flange body such that the EGR flange body is physically isolated from said isolation flange body.

8. The exhaust gas recycle (EGR) isolation flange assembly of claim 7 wherein said isolation flange boss defines a bore extending through said boss.

9. The exhaust gas recycle (EGR) isolation flange assembly of claim 7 wherein said isolation flange body defines a groove, said groove extending circumferentially around said body and disposed on a side of said body from which said boss extends and wherein said seal ring is received within said groove.

10. An exhaust gas recycle (EGR) isolation flange, comprising:
    an annular body defining a central aperture therethrough; and
    a plurality of bosses, wherein said plurality of bosses extend in a direction substantially perpendicular to a plane of said body and extend axially from an outer edge of said body.

11. The exhaust gas recycle (EGR) isolation flange of claim 10 wherein each of said plurality of bosses define a bore extending through said boss.

12. The exhaust gas recycle (EGR) isolation flange of claim 10 wherein said body defines a groove, said groove extending circumferentially around said body and disposed on a side of said body from which each said plurality of bosses extends.

13. A method for coupling an exhaust gas recycle (EGR) flange to a manifold comprised of a non-metallic material, comprising the acts of:
    mating said EGR flange to a first side of an isolation flange, wherein said EGR flange has an annular body and a boss receiving hub extending from said body on an outer periphery of said body, said boss receiving hub defining a boss receiving aperture, and wherein said isolation flange has an annular body and a boss, said boss extending axially from said body in a direction substantially perpendicular to a plane of said body and toward said first side of said isolation flange;
    wherein said act of mating said EGR flange to said isolation flange includes the acts of:
        receiving said isolation flange boss within said boss receiving aperture of said EGR flange;
        disposing a seal ring between said EGR flange body and said isolation flange body such that said EGR flange body is physically isolated from said isolation flange body; and mating a manifold flange comprised of the non-metallic material and associated with said manifold to a second side of said isolation flange.

14. The method of claim 13 wherein said seal ring is disposed in a groove defined in an axial end face of said isolation flange body.

15. The method of claim 13 wherein said non-metallic material is a plastic.

16. A method for coupling an exhaust gas recycle (EGR) flange to an isolation flange, comprising the acts of:

mating said EGR flange to a first side of an isolation flange, wherein said EGR flange has an annular body and a boss receiving hub extending from said body on an outer periphery of said body, said boss receiving hub defining a boss receiving aperture, and wherein said isolation flange has an annular body and a boss, said boss extending axially from said body in a direction substantially perpendicular to a plane of said body and toward said first side of said isolation flange;

wherein said act of mating said EGR flange to said isolation flange includes the acts of:

receiving said isolation flange boss within said boss receiving aperture of said EGR flange; and disposing a seal ring between said EGR flange body and said isolation flange body such that said EGR flange body is thermally isolated from said isolation flange body.

17. The method of claim 16 wherein said seal ring is disposed in a groove defined by said isolation flange body.

18. The method of claim 16 wherein said body of said isolation flange is comprised of a first material and said boss of said isolation flange is comprised of a second material.

19. The method of claim 16 wherein said isolation flange is comprised of aluminum.

* * * * *